United States Patent
Peacock et al.

(10) Patent No.: US 11,572,950 B2
(45) Date of Patent: Feb. 7, 2023

(54) SEALING TOOL FOR SEALING AN OPENING IN AN AIRCRAFT RIB

(71) Applicant: AIRBUS OPERATIONS LIMITED, Bristol (GB)

(72) Inventors: Antony Peacock, Bristol (GB); Paul Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 361 days.

(21) Appl. No.: 16/801,521

(22) Filed: Feb. 26, 2020

(65) Prior Publication Data
US 2020/0278026 A1 Sep. 3, 2020

(30) Foreign Application Priority Data
Feb. 28, 2019 (GB) .................. 1902681

(51) Int. Cl.
| | |
|---|---|
| *F16J 15/06* | (2006.01) |
| *B64F 5/10* | (2017.01) |
| *B64C 3/18* | (2006.01) |
| *B64C 7/00* | (2006.01) |

(52) U.S. Cl.
CPC .............. *F16J 15/061* (2013.01); *B64C 3/18* (2013.01); *B64C 3/182* (2013.01); *B64C 3/187* (2013.01); *B64C 7/00* (2013.01); *B64F 5/10* (2017.01)

(58) Field of Classification Search
CPC ............ B64C 3/18; B64C 3/182; B64C 3/187
See application file for complete search history.

(56) References Cited

U.S. PATENT DOCUMENTS

| | | |
|---|---|---|
| 9,944,402 B2 | 4/2018 | Perez Diaz et al. |
| 2014/0284426 A1 | 9/2014 | Erickson et al. |
| 2016/0355273 A1* | 12/2016 | Perez Diaz ............... B64C 3/34 |

FOREIGN PATENT DOCUMENTS

| | | |
|---|---|---|
| EP | 3 483 073 | 5/2019 |
| EP | 3 656 657 | 5/2020 |
| WO | 2019/013012 | 1/2019 |

OTHER PUBLICATIONS

Combined Search and Examination Report for GB 1902681.4 dated Aug. 21, 2019, 5 pages.
Extended European Search Report for European Application No. 20158363.0, 19 pages, dated Jul. 22, 2020.

* cited by examiner

*Primary Examiner* — Timothy D Collins
*Assistant Examiner* — Eric Acosta
(74) *Attorney, Agent, or Firm* — Nixon & Vanderhye P.C.

(57) ABSTRACT

Seal plates are typically mounted over stringer-receiving openings in aircraft ribs. A sealing tool for sealing a stringer-receiving opening in an aircraft rib is disclosed. The sealing tool includes a seal member arranged to seal a gap formed by the opening between the stringer and the rib. An intermediate member is configured to be adjustably mounted on the rib. The adjustable member receives and aligns the seal member over the gap.

23 Claims, 7 Drawing Sheets

SEALING TOOL FOR SEALING AN OPENING IN AN AIRCRAFT RIB

CROSS RELATED APPLICATION

This application claims priority to United Kingdom (GB) Patent Application 1902681.4, filed Feb. 28, 2019, the entire content of which is hereby incorporated by reference.

FIELD OF THE INVENTION

The present invention relates to a sealing tool for sealing a stringer-receiving opening in an aircraft rib. The present invention also relates to a seal assembly, an aircraft assembly, an aircraft, and a method of sealing a stringer-receiving opening in an aircraft rib.

BACKGROUND OF THE INVENTION

Aircraft wings are typically formed with a wing assembly comprising a pair of spars extending in a spanwise direction, and with a plurality of ribs extending in a chordwise direction. The ribs extend between the spars. A skin comprising lower and upper covers extends over the lower and upper sides of the spars and ribs.

Fuel in an aircraft is typically stored in one or more fuel tanks or sealed compartments located in the interior space of the wings and fuselage of the aircraft. The fuel tanks or sealed compartments are defined by structural components of the aircraft assembly. The boundary of such a fuel tank or sealed compartment may be at least partially defined by the spanwise extending spars, a pair of sealed ribs and the lower and upper covers.

A plurality of stringers are disposed on an inner surface of the skin and act to stiffen the skin. The stringers extend in the spanwise direction. As such, the stringers typically extend through the plurality of ribs. Cut-outs, acting as rib openings, are formed at the edges of the ribs through which the stringers extend. The cut-outs are provided with dimensions greater than those of the stringer to be received to account for tolerance build-up during manufacture and assembly of components.

To form sealed ribs, seal plates are typically provided to seal the cut-outs formed in the ribs. Each seal plate is fastened to the rib and extends over the opening to lie adjacent to the stringer extending therethrough. A bead of sealant provides a liquid tight joint between the sealing plate and the stringer to restrict the flow of fuel through the cut-out. With a known arrangement, each cut-out is sealed by a pair of seal plates, one on each side of the stringer.

Seal plates are manually installed from inside the fuel tank following assembly of the covers with the ribs. Seal plates are required to cover and seal the cut-outs. However, installation of the seal plates in an assembled fuel tank is difficult and time consuming.

SUMMARY OF THE INVENTION

According to an aspect of the present invention, there is provided a sealing tool for sealing a stringer-receiving opening in an aircraft rib, the sealing tool comprising: a seal member arranged to seal a gap formed by the opening between the stringer and the rib; and an intermediate member configured to be adjustably mounted on the rib; wherein the intermediate member is arranged to receive and align the seal member over the gap.

With such an arrangement it is possible to easily align the seal member over the gap. As such, the opening in the rib may be reliably sealed. By using an intermediate member it is possible to straightforwardly locate the seal member.

The seal member may be configured to be adjustably mounted on the intermediate member. As such, the seal member may be easily brought into correct alignment with the rib.

The seal member may comprise a seal plate. The seal member may comprise the seal carrier and a seal. The seal may be disposed on a seal edge of the seal carrier. The seal may be a curable seal member.

The intermediate member may be an intermediate plate.

The intermediate member may be configured to constrain sliding of the seal member on the intermediate member when the seal member is received on the intermediate member.

The intermediate member may be configured to constrain sliding of the seal member on the intermediate member to one direction when the seal member is on the intermediate member.

The intermediate member may comprise a guide channel configured to receive the seal member.

The sealing tool may comprise an alignment member. The intermediate member may be configured to alternately receive the seal member and the alignment member. The alignment member may be configured to be received by the intermediate member to aid alignment of the intermediate member on the rib.

The sealing tool may comprise a mount configured to mount the intermediate member on the rib and the seal member on the intermediate member.

The mount may be configured to selectably fix the intermediate member in a position on the rib.

The mount may comprise an intermediate member fixing configured to fix the intermediate member on the rib, wherein the intermediate member fixing is adjustable between at least two of: a fixed condition in which the intermediate member is fixed in a position on the rib; a guide condition in which the intermediate member is restrained by the intermediate member fixing and movable relative to the rib; and an unfixed condition in which the intermediate member is removable from the rib.

With such an arrangement, the ease of reliably locating and fixing the seal member on the rib is increased.

The mount may be configured to selectably fix the seal member in a position on the intermediate member.

The mount may be configured to selectably fix the seal member in a position on the intermediate member independently of the mount being configured to selectably fix the intermediate member in a position on the rib.

With such an arrangement it is possible to fix the intermediate member in position and separably locate and fix the seal member in a predetermined position using the intermediate member.

The mount may comprise a seal member fixing configured to fix the seal member on the intermediate member, wherein the seal member fixing is adjustable between at least two of: a fixed condition in which the seal member is fixed in a position on the intermediate member; a guide condition in which the seal member is movable relative to the intermediate member in a constrained manner; and an unfixed condition in which the seal member is removable from the intermediate member.

The seal member fixing may be configured to fix the alignment member on the intermediate member, wherein the seal member fixing is adjustable between at least two of: a fixed condition in which the alignment member is fixed in a position on the intermediate member; a guide condition in which the alignment member is movable relative to the intermediate member in a constrained manner; and an unfixed condition in which the alignment member is removable from the intermediate member.

The mount may comprise at least two guide members configured to protrude from the intermediate member. The guide members may be guide rods.

The intermediate member may be configured to slide along the rib about the guide members.

The sealing tool may comprise guide holes in the intermediate member through which the guide members are configured to extend.

At least one dimension of each of the guide holes may be greater than the corresponding dimension of each of the guide members to allow relative movement of the guide members in the guide holes.

The guide members may be configured to be received through mounting holes in the rib.

Each guide member may comprise a shoulder, wherein the intermediate member may be configured to be received between the shoulders and the rib.

The sealing tool may comprise at least one recess in at least one of the intermediate member and the seal member configured to receive the shoulders. Each shoulder may be received in a corresponding recess.

The guide members may be configured to extend through the seal member.

The guide holes in the intermediate member may be guide slots. The mounting holes in the rib may be mounting slots.

The guide members may be configured to slide in the mounting slots to allow the guide members to slide relative to the rib along the mounting slots.

The guide slots may be configured to extend transverse to the mounting slots when the guide members extend through the rib mounting slots and the intermediate member guide slots.

According to an aspect of the present invention, there is provided a seal assembly for sealing a stringer-receiving opening in an aircraft rib, the seal assembly comprising: an intermediate member on the rib; and a seal member on the intermediate member, the seal assembly sealing a gap formed by the opening between the stringer and the rib; wherein the intermediate member receives and aligns the seal member over the gap.

The seal assembly may comprise a mount fixing the intermediate member with the rib and the seal member with the intermediate member.

According to an aspect of the present invention, there is provided an aircraft assembly comprising: a rib having an opening between two rib feet; a stringer received in and extending through the opening; and a seal assembly as set out above sealing a gap formed by the opening between the stringer and the rib.

According to an aspect of the present invention, there is provided an aircraft comprising at least one of a seal assembly as set out above and an aircraft assembly as set out above.

According to an aspect of the present invention, there is provided a sealing tool for sealing a stringer-receiving opening in an aircraft rib, the sealing tool comprising: a seal member arranged to seal a gap formed by the opening between the stringer and the rib; and an intermediate member arranged to receive and align the seal member over the gap. The mount may be configured to mount the intermediate member with the rib and the seal member with the intermediate member.

According to an aspect of the present invention, there is provided a method of sealing a stringer-receiving opening in an aircraft rib with a sealing tool; the sealing tool comprising an intermediate member, and a seal member on the intermediate member; the method comprising: aligning the intermediate member with the opening; fixing the intermediate member on the rib; using the intermediate member to align the seal member over a gap formed by the opening between the stringer and the rib; and, fixing the seal member over the gap to seal the opening.

The method may comprise using an alignment member to align the intermediate member prior to fixing the intermediate member on the rib.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
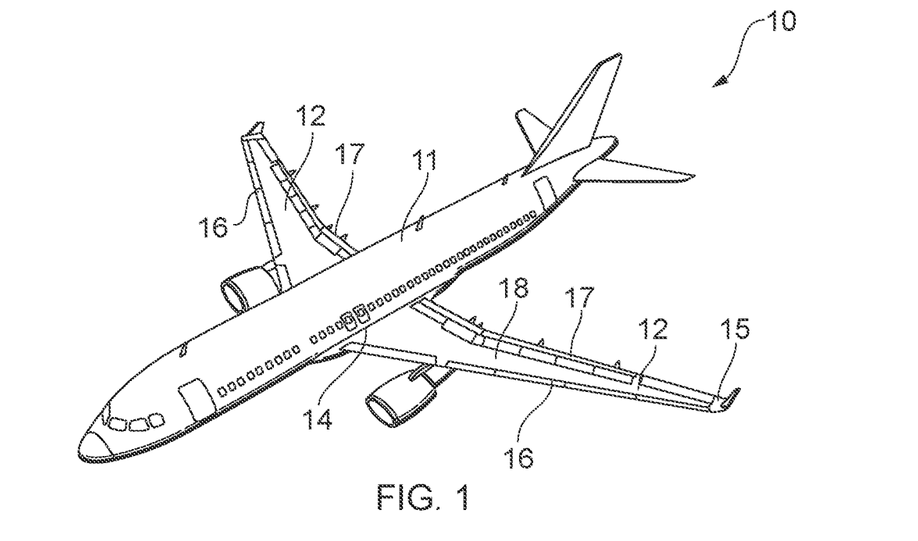
FIG. 1 is a perspective view of an aircraft.

An aircraft 10 is shown in FIG. 1. The aircraft 10 includes a fuselage 11. Two wings 12 extend from the fuselage 11. It will be appreciated that the fuselage 11 and wings 12 may take a variety of different planformed shapes and profiles. Each wing 12 has a wing root 14 at the juncture with the fuselage 11. The wing 12 has a wing tip 15 at a distal end to the wing root 14. The wing 12 has a leading edge 16 and a trailing edge 17. The wing 12 comprises a wing box 18. The wing box 18 is an aircraft assembly.

One of the wings 12 will be described herein. The wing 12 has a spanwise axis which extends in a direction from the wing root 14 to the wing tip 15. The wing 12 has a chordwise axis which extends in a direction from the leading edge 16 to the trailing edge 17. The wing has a vertical axis which extends perpendicular to the spanwise and chordwise axes.

Figure 2:
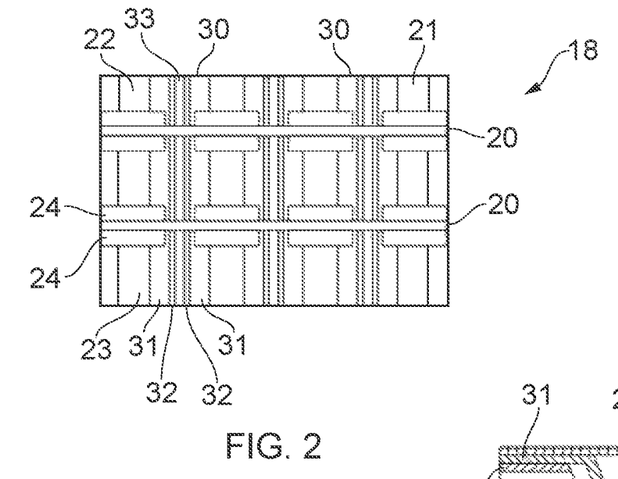
FIG. 2 is a cut-away schematic plan view from below of an inner side of an upper cover of a wing box assembly of a wing.

Part of the wing box 18 is shown in FIG. 2. The wing 12 comprises a pair of spars (not shown) extending in the spanwise direction. A plurality of ribs 20 extend in the chordwise direction. The ribs 20 are substantially planar, and located at intervals along the span of the wing 12. The ribs 20 extend between the spars (not shown). Part of two ribs 20 are shown in FIG. 2. The wing 12 has a skin 21 comprising an upper cover and a lower cover. The upper cover 22 is shown in FIG. 2. The wing box 18 defines a number of sealed compartments or fuel tanks which are separated from each other by the ribs 20.

Each sealed compartment has upper and lower walls provided by the upper and lower covers, fore and aft walls provided by the spars (not shown), and inboard and outboard walls provided by a pair of sealed ribs 20. The inboard and outboard walls may be defined by adjacent ribs 20. In one embodiment, intermediate unsealed ribs are provided in the fuel compartment. The pair of sealed ribs 20 provide boundaries between the sealed compartments. The sealed ribs 20 are sealed around their peripheries to prevent fuel flowing from the sealed compartment, across the plane of the sealed ribs 20, apart from through predetermined conduits, as determined.

A plurality of stringers 30 run spanwise along the wing 12. The plurality of stringers 30 extend spanwise along the skin 21 and act to stiffen the skin 21. The stringers 30 are fastened to the skin 21. The stringers 30 extend transverse to the ribs 20.

Figure 3:
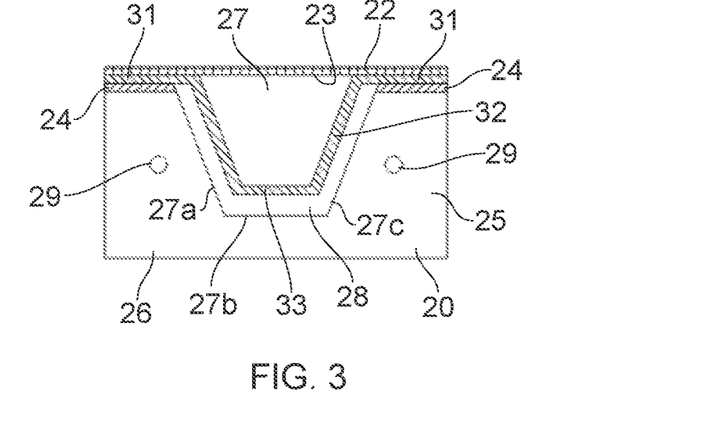
FIG. 3 is a cross-sectional side view of part of the wing box assembly shown in FIG. 2 at an interface of a rib, a stringer and an upper cover.

Three stringers 30 are shown in FIG. 2. The stringers 30 have a generally top-hat section profile as shown in FIG. 3, although the stringers may have an alternative profile, such as a T-section or L-section. Each stringer 30 has a pair of stringer feet 31 attached to an inner surface 23 of the upper cover 22 and a pair of stringer webs 32 extending away from the upper cover 22. The stringer webs 32 upstands from the stringer feet 31. A stringer flange 33 extends between the distal ends of the stringer flanges 33. The stringer 30 protrudes from the upper cover 22.

Each rib 20 is attached to the upper cover 22 by a series of rib feet 24. A plurality of rib feet 24 are shown in FIG. 2. In this case the rib feet 24 are attached to stringer feet 31 of the stringer 30. As such the ribs 20 mount to the skin 21 via the stringers 30. Each rib 20 has a rib web 25 (refer to FIG. 3). The rib web 25 upstands from the rib feet 24. The rib web 25 defines a face 26. The rib web 25 comprises a substantially planar panel. The rib feet 24 comprise flanged sections extending perpendicular to the plane of the rib web 25.

Referring to FIG. 3, the ribs 20, skin 21 and stringers 30 are mounted together to form an aircraft assembly. The mounting configuration may differ and may include one or more of fasteners, such as rivets (not shown), co-curing, co-bonding and secondary bonding.

The stringers 30 extend through the ribs 20. Each stringer 30 extends through each rib 20 at the juncture of the two components. A cut-out 27 is formed in the rib 20 to allow the stringer 30 to pass through. The cut-out 27 is in the rib web 25. The cut-out 27 is between adjacent rib feet 24. The cut-out 27 is formed in an edge of the rib 20 proximal to the skin. The cut-out 27 acts as an opening in the rib 20. The cut-out 27 is known as a mouse hole. The cut-out 27 has a first side edge 27a, a second, opposing, side edge 27b, and an upper edge 27c.

The cut-out 27 forms a gap 28 between the stringer 30 and the rib 20. The gap 28 is formed between the stringer 30 and the edges 27a,b,c of the cut-out 27. The stringer webs and flange 32, 33 are spaced from the rib 20. The gap 28 extends around the periphery of the stringer 30 received in the cut-out 27.

As described hereinafter with reference to FIGS. 4 to 14, the gap 28 is covered by a seal assembly 40. The seal assembly 40 prevents fuel from flowing across the rib 20 through the gap 28. The rib 20 has mounting holes 29. The mounting holes 29 extend through the rib web 25. Two mounting holes 29 are spaced either side of the cut-out 27 formed in the rib web 25. Each mounting hole 29 is circular, although it will be understood that other hole shapes may be used. The mounting holes 29 form between the rib foot 24 and the end of the cut-out 27.

Figure 4:
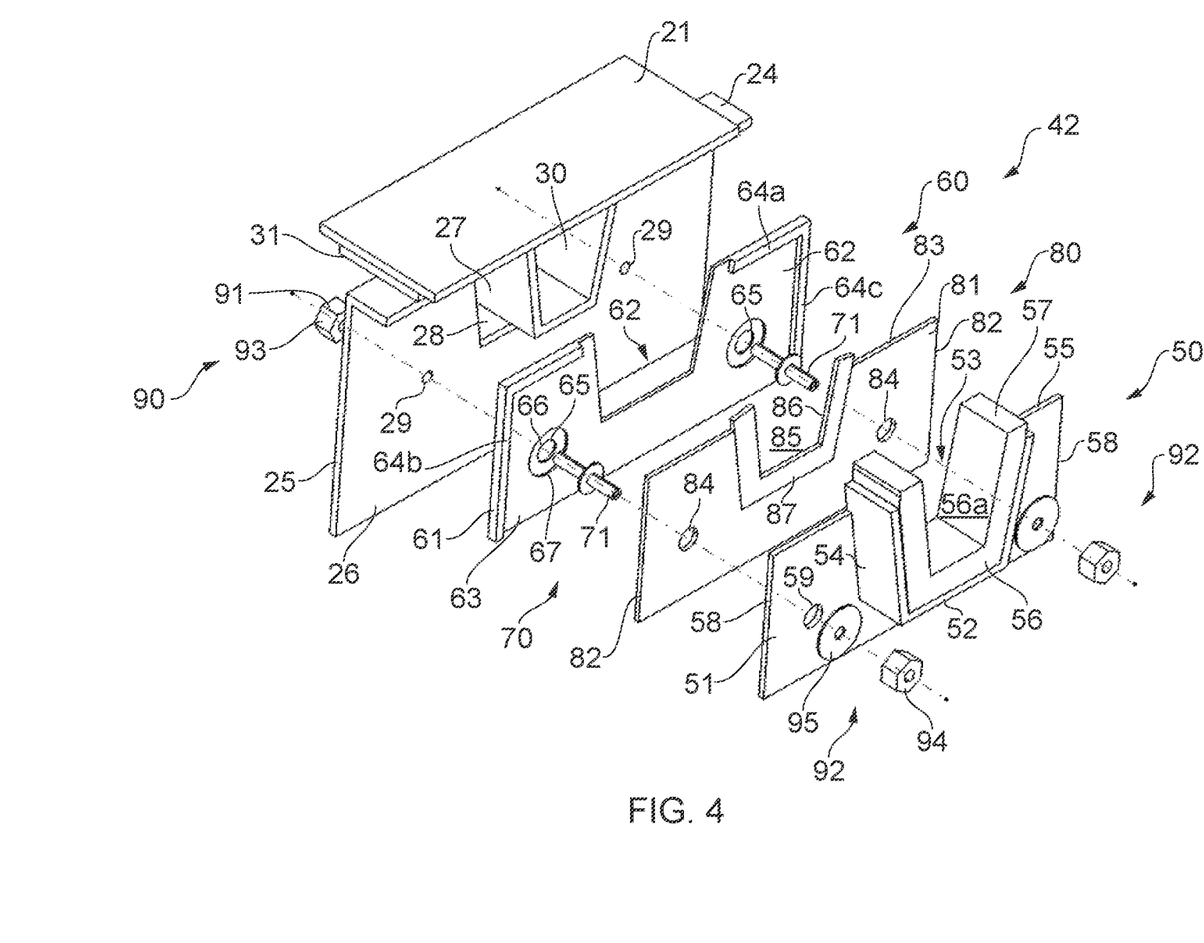
FIG. 4 is a schematic exploded perspective view of a sealing tool and part of a stringer, the sealing tool including a seal plate, an intermediate plate, an alignment plate and a mount.
Figure 12:
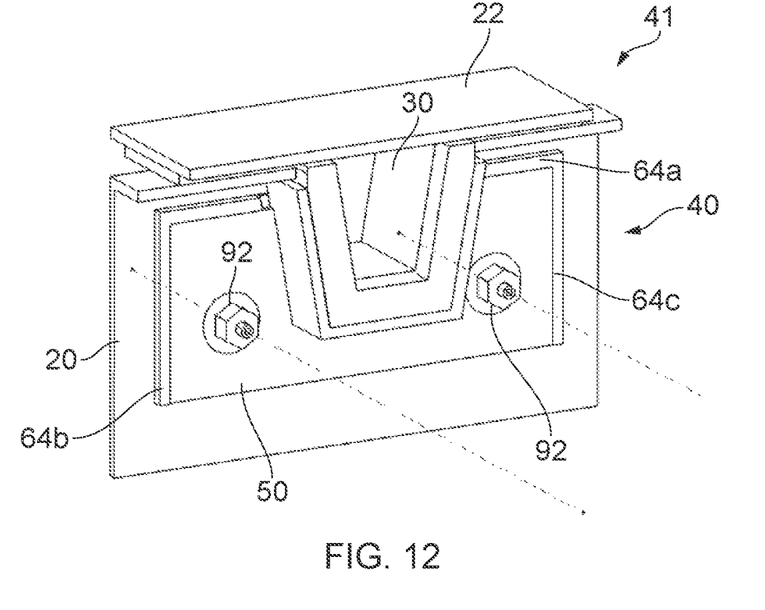
FIG. 12 is a schematic perspective view of the sealing tool in the third configuration.
Figure 13:
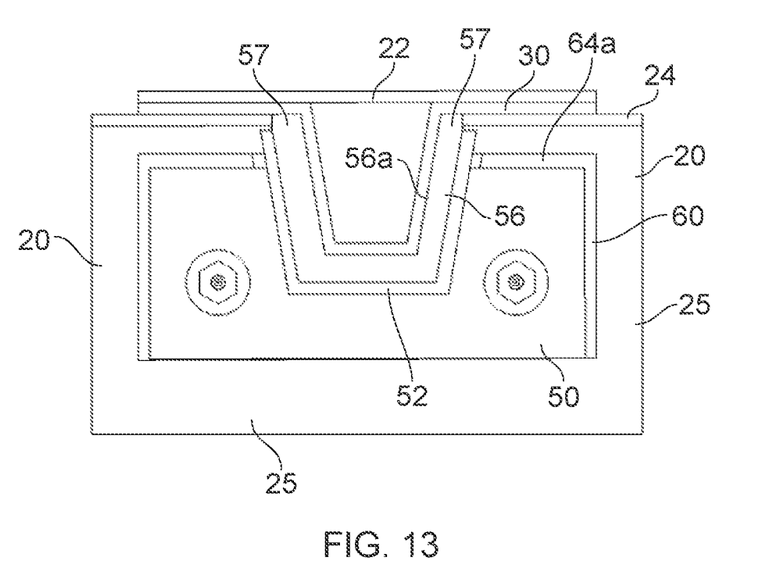
FIG. 13 is a schematic front view of the sealing tool in the third configuration on the rib and stringer.

The seal assembly 40 is shown in FIGS. 12 and 13 in an assembled state with the rib 20, stringer 30 and upper cover 22. The seal assembly 40, rib 20 and stringer 30 together form an aircraft assembly 41. The seal assembly 40 is formed by a sealing tool 42. The sealing tool 42 is shown in FIG. 4 in an exploded view together with a portion of the rib 20, stringer 30 and upper cover 22. The rib 20, upper cover 22 and stringer 30 are shown in an assembled state with the gap 28 formed by the mousehole 27. The mounting holes 29 are shown extending through the rib web 25. The mounting holes 29 extend from the rib face 26. The sealing tool 42 is mounted on the rib face 26.

The rib tool 42 and the forming of the seal assembly 40 will now be described.

The sealing tool 42 comprises a seal plate 50, an intermediate plate 60, a mount 70 and an alignment plate 80. The seal plate 50 and alignment plate 80 are interchangeably mounted on the intermediate plate 60. The mount 70 includes a pair of guide members 71. The guide members 71 are used to align and mount the other components of the sealing tool 42. The mount 70 includes an intermediate member fixing 91 and a seal member fixing 92. A fastener 90 is formed by one of the guide members 71, one of the intermediate member fixings 90 and one of the seal member fixings 91.

The intermediate plate 60 is mountable on the rib web 25. The intermediate plate 60 acts as an intermediate member, and is received between the rib 20 and the seal plate 50. The seal plate 50 acts as a seal member. The intermediate plate 60 acts as a base of the sealing tool 42 and has an underside 61 which is locatable against the face 26 of the rib 20. A cut-away 62 is formed in the intermediate plate 60 to receive the stringer 30 extending through the rib 20. The shape of the cut-away 62 of the intermediate plate 60 corresponds generally to the cut-out 27 in the rib 20. However, it will be understood that the profile of the cut-away 62 relative to the cut-out 27 may differ, such that at least part of the intermediate plate 60 overhangs and/or is retracted from the gap 28. The cut-away 62 is sized so as to be spaced from the stringer 30 when the intermediate plate 60 is disposed on the rib 20.

The intermediate plate 60 comprises a guide channel 62. The guide channel 62 is formed in a front side 63 of the intermediate plate 60. The guide channel 62 is defined by ridges proximate to the periphery of the intermediate plate 60. The guide channel 62 is configured to accommodate the seal plate 50. As such, the seal plate 50 is receivable in the guide channel 62. An end of the channel acts as a stop 64a.

The stop 64a limits movement of the seal plate 50 when the seal plate 50 is received by the intermediate plate 60. Side ridges form guide rails 64b, 64c. The guide rails 64b, 64c act as guide surfaces to constrain movement of the seal plates on the intermediate plate in a chordwise direction when the seal plate 50 is received by the intermediate plate 60.

The intermediate plate 60 includes two guide holes 65. The guide holes 65 extend through the intermediate plate 60. The guide holes 65 are configured to align with the mounting holes 29 in the rib 20. The intermediate plate 60 has two guide holes 65, with the distance between the centres of the guide holes 65 corresponding to the distance between the centres of the mounting holes 29 in the rib 20. The guide holes 65 are disposed on either side of the cut-away 62. Each guide hole 65 includes a bore 66 formed through the intermediate plate 60 and a recess 67 extending circumferentially around the bore 66. The recess 67 is formed in the surface of the guide channel 62. That is, each guide hole 65 has a recessed periphery. In embodiments, the recess 67 of each guide hole is a countersink.

The mount 70 includes the two guide members 71. The mount 70 includes the intermediate member fixing 91 and the seal member fixing 92. The guide members 71 and the intermediate member fixing 91 act to mount the intermediate plate 60, to the rib 20. The seal member fixing 92 and the guide members 71 together act to mount the seal plate 50, acting as the seal member, on the intermediate plate 60. The seal member fixing 92 together with the guide member 71 act to mount the alignment plate 80, acting as an alignment member, to the intermediate plate 60. The alignment plate 80 is interchangeable on the intermediate plate 60 with the seal plate 50.

Figure 6:
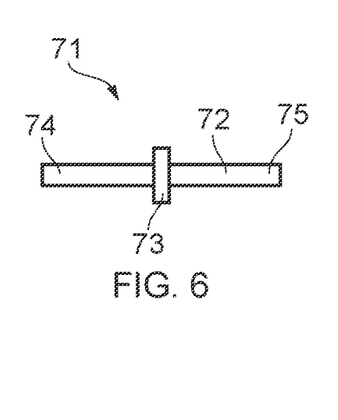
FIG. 6 is a side view of a guide member of the mount.

One of the guide members 71 is shown in FIG. 6. The guide member 71 comprises a guide rod 72. The guide member 71 has a shoulder 73. The shoulder 73 is disposed between distal ends of the guide rod 72. That is, a first portion of the guide rod 72 extends from one side of the shoulder 73 and a second portion of the guide rod 72 extends from the other side of the shoulder 73. The intermediate member fixing 91 is engaged at one end of the guide member 71 and the seal member fixing 92 is at the other end of the guide rod member 71. The intermediate member fixing 91 comprises a nut 93 which is threadably engageable with a first threaded end 74 of the guide member 71. The seal member fixing 92 comprises a nut 94 which is threadably engageable with a second threaded end 75 of the guide member 71. The seal member fixing 92 comprises a washer 95.

The diameter of the first portion of the guide rod 72 is configured to correspond with the diameter of the mounting holes 29 in the rib 20. The diameter of the guide holes 65 is greater than the diameter of the guide rod 72. The diameter of the bore 66 is greater than the diameter of the first portion of the guide rod 72. The diameter of the recess 67 is greater than the diameter of the shoulder 73. As such, when the guide rod is received by the intermediate plate 60 the intermediate plate 60 is slideable about the guide members 71 along the plane of the intermediate plate 60. The plane extends perpendicular to the longitudinal axis of the guide member 71 when assembled. The thickness of the shoulder 73 corresponds to or is less than the depth of the recess 67. As such, the shoulder 73 does not protrude from the recess 67.

The guide surfaces 64b, 64c extend parallel to each other. The stop 64a extends perpendicular to the guide surfaces 64b, 64c.

The seal plate 50 comprises a seal base 51. A seal carrier 52 is on the base 51. A seal plate cut-away 53 is formed in the seal base 51. The seal place cut-away 53 is configured to receive the stringer 30. The seal plate cut-away 53 has inner dimensions which are greater than the dimensions of the stringer 30 configured to be received therein. The seal carrier 52 comprises a seal trough 54. The seal trough 54 upstands from the seal base 51 around the periphery of the seal plate cut-away 53. The seal trough 54 protrudes from an upper edge 55 of the seal base 51. The seal carrier 52 is configured to carry a seal 56.

The seal 56 is generally U-shaped. The seal 56 is configured to be received by the seal carrier 52 and is supported thereon. The seal 56 comprises a curable foam sealant, for example an open cell polyurethane impregnated with a polysulphide sealant. Upper ends 57 of the seal 56 protrude from the free ends of the seal carrier 52. The seal 56 has a thickness in the spanwise direction. The seal plate 50 has guide edges 58. The guide edges 58 are formed by opposing parallel edges of the seal base 51. The width of the seal base 51, and therefore the distance between the guide edges 58, corresponds to the width of the guide channel 62 of the intermediate plate 60.

The seal plate 50 is configured to be received by the intermediate plate 60. The seal base 51 is configured to be received in the guide channel 62. When the seal base 51 is received in the guide channel 62, the guide edges 58 slideably abut the guide rails 64b, 64c of the guide channel 62. The seal base 51 is slidable in the guide channel 62 parallel to the guide edges 58. The upper edge 55 of the seal base 51 is configured to abut against the stop 64a to restrict movement of the seal base 51 relative to the intermediate plate 60 in the vertical direction. The free ends 57 of the seal 56 are protrudable from an upper end of the intermediate plate 60 when the upper edge 55 abuts the stop 64a.

The seal 56 has an inner abutment surface 56a. The inner abutment surface 56a has a profile corresponding to the profile of the stringer 30. That is the inner abutment surface 56a of the seal 56 is configured to abut against and seal with the outer surface of the stringer 30.

Float holes 59 are formed in the seal plate 50. Two float holes 59 are formed through the seal base 51. The location of the float holes 59 corresponds to the location of the guide holes 65 in the intermediate plate 60. The distance between the centres of the two float holes 59 in the seal plate 50 corresponds to the distance between the centres of the guide holes 65 in the intermediate plate 60. When the seal plate 50 is received by the intermediate plate 60, the float holes 59 are configured to at least partially align with the guide holes 65. As such, the guide member 71 is locatable through both the float holes 59 and the guide holes 65. The diameter of each float hole 59 is greater than the diameter of the second portion of the guide rod 72. In the present embodiment, the diameter of the float hole 59 corresponds to the diameter of the respective guide hole 65.

The alignment plate 80 comprises an alignment base 81. The alignment base 81 generally corresponds to the configuration of the seal base 51. The alignment base 81 has alignment guide edges 82. The alignment guide edges 82 are configured to lie against the guide rails 64b, 64c of the intermediate plate 60 when the alignment plate 80 is received by the intermediate plate 60. The alignment plate 80 is configured to be received by the guide channel 62 of the intermediate plate 60. The alignment base 81 has an alignment upper edge 83. The alignment edge 83 is configured to abut against the stop 64a of the guide channel 62 in the intermediate plate 60. The alignment base 81 comprises alignment float holes 84. The alignment float holes 84 correspond to the float holes 59 of the seal plate 50. The alignment float holes 84 are formed through the alignment base 81.

Two alignment float holes 84 are spaced apart from each other with the distance between the centres of the two alignment float holes 84 corresponding to the distance between the centres of the guide holes 65 in the intermediate plate 60. The diameter of each alignment float hole 84 is greater than the diameter of the second portion of the guide rod 72 configured to be received therethrough. In the present embodiment, the diameter of each alignment float hole 84 corresponds to the diameter of the corresponding guide hole 65 in the intermediate plate 60. The guide member 71 received in each alignment float hole 84 is therefore moveable about the float hole 84 perpendicular to its longitudinal axis.

The alignment plate 80 comprises an alignment cut-out 85. The alignment cut-out 85 extends from the alignment upper edge 83. The alignment cut-out 85 is configured to receive the stringer 30 therethrough. The alignment plate 80 has an alignment edge 86. The alignment edge 86 is defined in the alignment cut-out 85. The alignment edge 86 is configured to abut against the stringer 30 to align the intermediate plate 60 on the rib 20, and subsequently align the seal plate 50 to seal the gap 28, as will be described below. The alignment edge 86 is configured to abut against the stringer flange 33 to provide alignment in the vertical direction and to abut against the stringer webs 32 to provide alignment in the chordwise direction. An alignment element 87 is disposed to define the alignment edge 86. The alignment element 87 is at the periphery of the alignment cut-out 85. The alignment element 87 is on the alignment base 81.

The alignment element 87 is formed from a resilient material, for example a rubber strip. The alignment element 87 may be bonded to the plate section of the alignment base 81. The resilience of the alignment element 87 is configured to correspond to the resilience of the seal 56. As such, the alignment element 87 is configured to take into account the compression of the seal 56.

Assembly of the seal assembly 40 will now be described below. The seal assembly 40 is assembled using the sealing tool 42.

The rib 20, upper cover 22 and stringer 30 are pre-assembled. The rib foot 24 is assembled on the stringer foot 31 with the upper cover 22 being disposed on the opposing side. The stringer 30 extends through the mousehole 27 formed in the rib 20. The mousehole 27 is between two adjacent rib feet 24. The gap 28 is formed between the edges 27a, b, c, of the cut-out 27 and the stringer feet 31, stringer web 32 and stringer flange.

Figure 5:
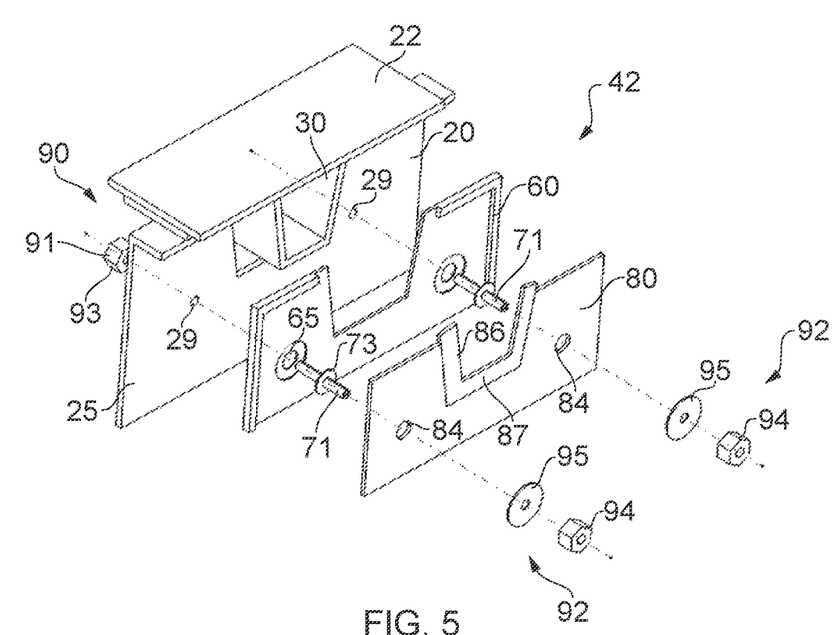
FIG. 5 is a schematic exploded perspective view of the sealing tool in a first configuration with the alignment plate, the intermediate plate, and guide members of the mount.
Figure 7:
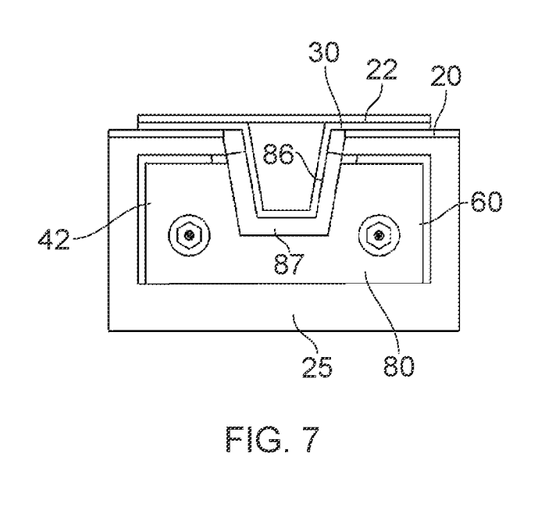
FIG. 7 is a schematic front view of the sealing tool in the first configuration of FIG. 5 relative to part of a stringer.
Figure 8:
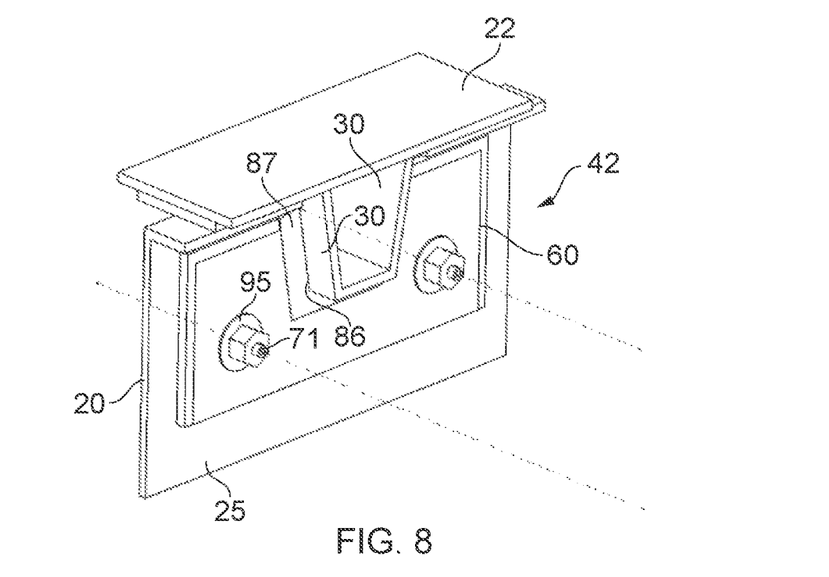
FIG. 8 is a schematic front perspective view of part of the rib and stringer with the tool in the first configuration shown in FIG. 7.

As shown in FIGS. 5, 7 and 8 the seal tool 42 is assembled on the rib 20 in a first configuration. The seal tool 42 is assembled with the intermediate plate 60 disposed against the rib web 25. Guide members 71 are received through the guide holes 65. The intermediate plate 60 is received between the shoulder 73 of each guide member 71 and the rib web 25. Each guide member 71 is received through a respective one of the mounting holes 29 in the rib web 25. The nut 93 of the intermediate member fixing 91 retains the guide member 71 and therefore the intermediate plate 60 on the rib 20. The intermediate plate 60 is initially retained on the rib 20 in a guide condition in which the intermediate member fixing 93 is loosely fastened to allow intermediate plate 60 to slide relative to the rib web 25. The two guide members 71 are used to restrain rotation of the sealing tool 42.

The alignment plate 80 is received by the intermediate plate 60. The alignment plate 80 is received in the guide channel 62 with the guide members 71 being received through the respective alignment float holes 84. The nuts 94 and washers 95 of the seal member fixing 92 are used to retain the alignment plate 80 on the intermediate plate 60 and therefore on the rib web 25.

The seal member fixing 92 is configured to be in a guide condition in which the alignment plate 80 is slideable relative to the intermediate plate 60 in a constrained manner.

In the guide condition, it is possible to adjust the position of the alignment plate 80 and the intermediate plate 60. The alignment plate 80 is retained by the intermediate plate 60. By bringing the alignment edge 86 of the alignment plate 80 into abutment with the stringer 30, it is possible to align the intermediate plate 60 on the rib web 25.

It will be understood that the alignment plate 80 is configured to correspond with the seal plate 50. That is, the alignment element 87 is configured to take the seal 56 into account when the seal plate 50 is used to seal the gap 28. The profile of the alignment element 87 corresponds to that of the seal 56. It will be understood that in some embodiments the alignment element 67 may be omitted, and the alignment edge 86 may be an edge of the plate section.

When the alignment plate 80 is brought into contact with the stringer 30, the intermediate plate 60 is brought into the correct position. The dimensions of the guide holes 65 and alignment float holes 84 allow for the intermediate plate 60 to slide about the guide members 71 and therefore the rib web 25. The intermediate plate 60 is slideable in both the vertical and chordwise directions.

Figure 9:
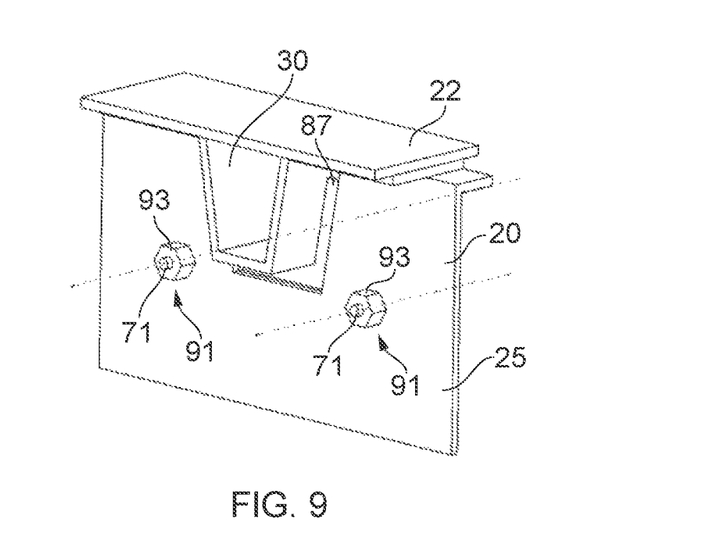
FIG. 9 is a schematic rear perspective view of part of the rib and stringer with the tool in the first configuration shown in FIG. 7.

When the intermediate plate 60 is correctly located, the intermediate member fixing 91 is tightened into a fixed condition. As shown in FIG. 9, the nuts 93 are tightened when the intermediate member fixing 91 is in the fixed condition, the intermediate plate 60 is retained in a fixed orientation on the rib web 25. The intermediate plate 60 is retained between the shoulder 73 and the intermediate member fixing nuts 93.

Figure 10:
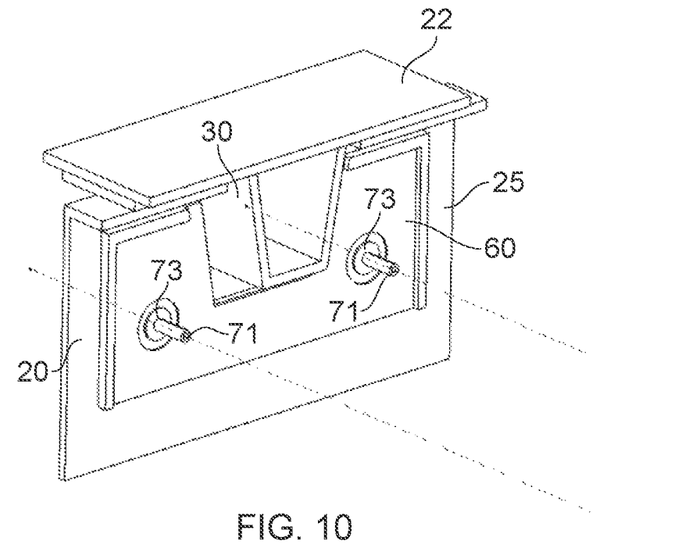
FIG. 10 is a schematic perspective view of part of the rib and stringer with the tool in a second configuration with the intermediate plate on the rib and the alignment plate removed.

The alignment plate 80 may then be removed as shown in FIG. 10. The seal member fixing 92 of each guide member 71 is unfastened into an unfixed condition in which the alignment plate 80 is slideable from the guide members 71 to be removed. The alignment plate 80 is moveable along the guide members 71 to remove the alignment plate 80 from the guide members 71. Due to the greater size of the alignment float holes 84, it is possible to ease the movement of the alignment plate 80 by allowing the alignment plate to drop slightly away from the stringer 30. Although the seal member fixing 92 is in an unfixed condition to allow removal of the alignment plate 80, it will be appreciated that the intermediate plate 60 is retained in a fixed condition on the rib 20. As such, the position is retained.

Figure 11:
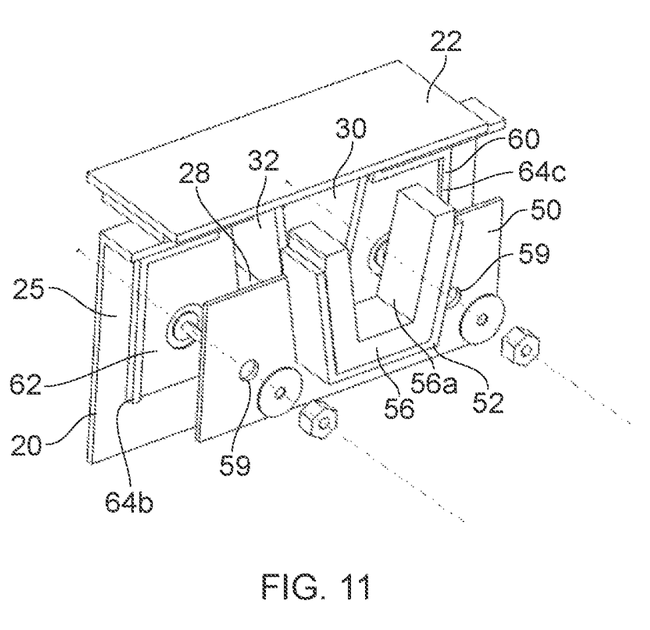
FIG. 11 is a schematic perspective view of the sealing tool in a third configuration with the intermediate plate on the rib and the seal plate replacing the alignment plate.

The seal plate 50 is then assembled with the intermediate plate 60 as shown in FIG. 11. The seal plate 50 is positioned on the guide members 71 with the guide members 71 extending through the float holes 59. The seal plate 50 is disposed on to the intermediate plate 60 as shown in FIGS. 12 and 13. The seal plate 50 is received in the guide channel 62. The seal 56 is pre-assembled on the seal carrier 52. When the seal plate 50 is received by the intermediate plate 60, the seal 56 is aligned with the stringer 30. The seal 56 may then be brought into abutment with the stringer 30. The inner abutment surface 56a of the seal 56 is brought into abutment with the stringer feet 31, stringer web 32 and stringer flange 33 to seal the gap 28. The seal plate 50 is guided in the vertical direction by the guide rails 64*b*, 64*c*. The guide rails 64*b*, 64*c* restrain movement of the guide plate 50 in the chordwise direction.

Movement of the seal plate 50 in the vertical direction is restrained by the seal plate 50 abutting the stop 64*a* of the intermediate plate 60. The seal 56 is then disposed over the gap 28 to seal the gap 28.

The washers 95 and bolts 94 are then engaged on the guide members 71 to move the seal member fixing 92 into its fixed condition. The seal plate 50 is then fixed in position relative to the stringer 30 and the rib 20. The gap 28 is covered. The seal 56, formed from a curable seal material, for example an open cell polyurethane impregnated with a polysulphide sealant, is then cured to complete sealing of the gap 28.

In an alternative embodiment, the alignment plate 80 is incorporated with the seal plate 50. In such an embodiment the seal 56 is initially omitted from the seal carrier 52. A separate alignment element is disposed in the seal carrier 52. The seal base 51 and seal carrier 52 with the alignment element received therein is then used as the alignment plate to align and fix the intermediate plate 60 on the rib 20. Once the intermediate plate 60 is fixed in position, the seal plate 50 is removed and the alignment element 87 is replaced by the seal 56. The seal plate 50 with the seal 56 in place is then disposed on the intermediate plate 60 and fixed in position.

The diameter of the mounting holes 29 correspond to the diameter of the guide members 71 received therethrough so as to align the guide members 71. The recess 67 allows for the shoulder to be retracted from the guide channel 62 so as to allow correct positioning of the seal plate 50 and alignment plate 80. The corresponding dimensions of the seal plate 50 and alignment plate 80 allow for these two parts to be interchangeable. It will be understood that in an alternative embodiment, at least part of the recess is formed in the underside of each of the seal plate 50 and alignment plate 80 to allow the shoulder 73 of the respective guide member 71 to be received therein.

Figure 14:
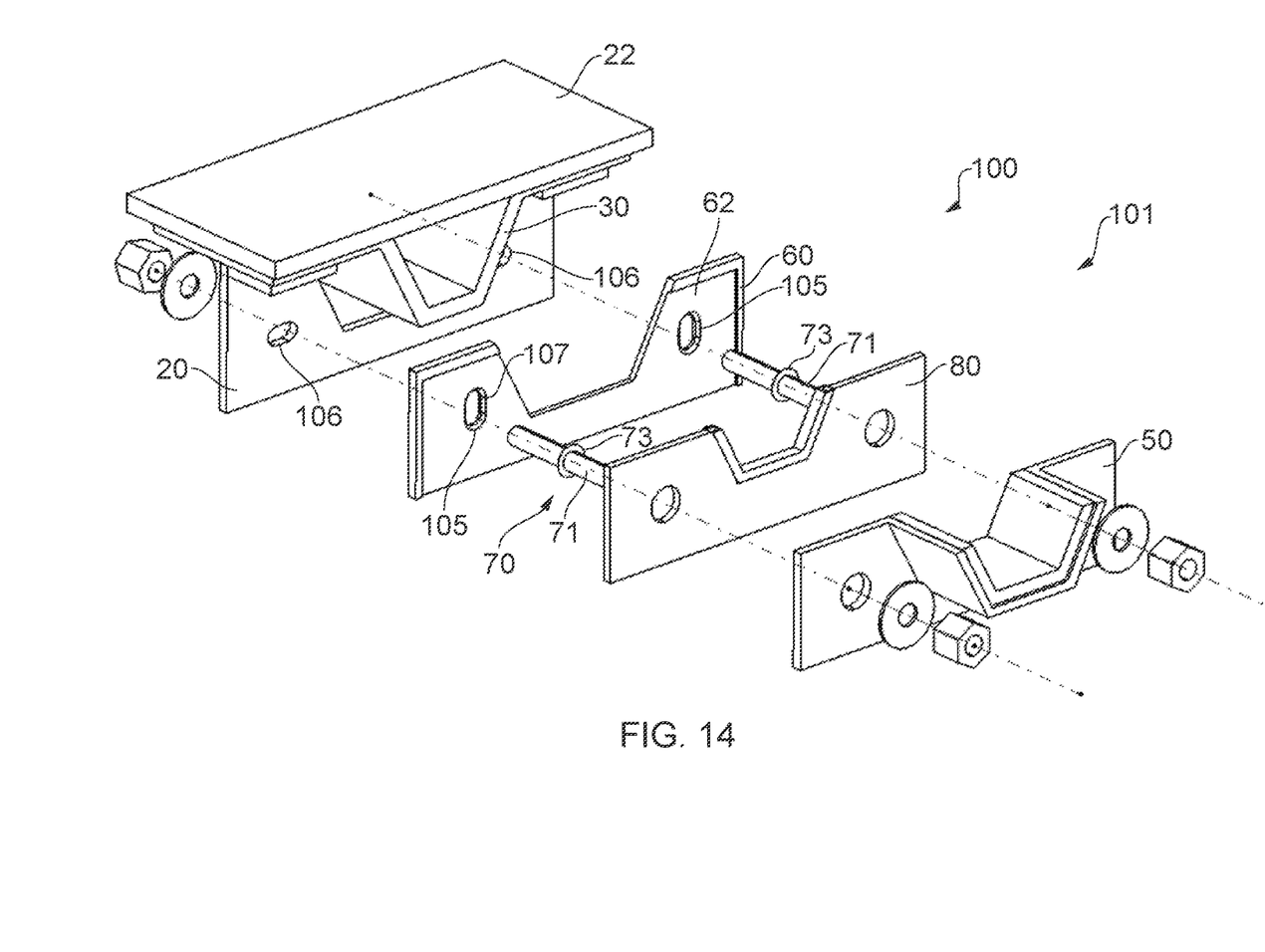
FIG. 14 is an exploded perspective view of the rib and stringer with an alternative embodiment of the seal tool.

Another embodiment of the sealing tool will now be described with reference to FIG. 14. The arrangement of a seal assembly 100 and sealing tool 101 of the embodiment shown in FIG. 14 is generally the same as that described above, and so a detailed description will be omitted. Generally, the configuration of the rib 20, stringer 30, upper cover 22, seal plate 50, intermediate plate 60, mount 70 and alignment plate 80 correspond to that of the above described components. As such, the same reference numerals will be used herein. In this embodiment, the mount 70 includes guide slots 105 which form the guide holes in the intermediate plate 60, acting as the intermediate member. The guide slots 105 extend in the vertical direction. The guide slots 105 are elongate.

Mounting slots 106 form the mounting holes in the rib 20. The mounting slots 106 are elongate.

The guide slots 105 extend in the vertical direction. The mounting slots 106 extend in the chordwise direction. The guide slots 105 and mounting slots 106 extend perpendicular to each other. The width of each of the guide slots 105 and mounting slots 106 corresponds to the diameter of the guide member 71 received therein. The length of each of the guide slots 105 and mounting slots 106 is greater than the diameter of the respective guide member 71 received therein. As such, the guide slots 105 constrain movement in one direction relative to the guide member 71 in the plane of the rib web 25 and the mounting channels 106 constrain movement to one direction about the guide members 71 in the plane of the rib web 25. Each guide slot 105 comprises a countersink 107 acting as a recess in the surface of the guide channel 62. The countersink 107 is configured to receive a correspondingly shaped shoulder of the guide member 71. The countersink 107 prevents the shoulder 73 of the guide member 71 protruding into the guide channel 62. When the sealing tool 42 is disposed on the rib 20, the guide member 71 is able to slide in the mounting slot 106 in the chordwise direction, such that the intermediate plate 60 is positionable in the chordwise direction. The intermediate plate 60 is slideable about the guide members 71 in the vertical direction about each of the guide members 71 in the vertical direction. An advantage of this arrangement is that rotation of the intermediate plate 60 is restricted.

The plates 50, 60, 70 are formed from a rigid material, such as aluminium.

Although reference to the aircraft assembly, ribs, covers and stringers are described herein with reference to the wing box 18, it will be understood that in embodiments such an aircraft assembly relates to another aircraft assembly, for example part of the fuselage, another wing assembly or horizontal/vertical stabilisers. The method and tool described herein may also be applied to such an aircraft assembly.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A sealing tool for sealing a stringer-receiving opening in an aircraft rib, the sealing tool comprising:
   a seal member comprising a seal plate and a seal, the seal member is arranged to seal a gap formed by the opening between a stringer and the aircraft rib; and
   an intermediate member comprising an intermediate plate;
   wherein the intermediate member is arranged to receive and align the seal member over the gap; and
   wherein the seal number is adjustably mounted on the intermediate member, and the sealing tool further comprising a mount configured for mounting the intermediate member on the aircraft rib with the intermediate member positioned between the aircraft rib and the seal member.

2. The sealing tool of claim 1, wherein the intermediate member is configured to constrain sliding of the seal member on the intermediate member when the seal member is received on the intermediate member.

3. The sealing tool of claim 2, wherein the intermediate member is configured to constrain sliding of the seal member on the intermediate member to one direction when the seal member is on the intermediate member.

4. The sealing tool of claim 1, wherein the seal member comprises a seal carrier and a seal.

5. The sealing tool of claim 1, comprising an alignment member, wherein the intermediate member is configured to alternately receive the seal member and the alignment member, wherein the alignment member is configured to be received by the intermediate member to aid alignment of the intermediate member on the aircraft rib.

6. The sealing tool of claim 1, wherein the mount further provides the adjustable mounting of the seal member on the intermediate member.

7. The sealing tool of claim 6, wherein the mount is configured to selectably fix the intermediate member in a position on the aircraft rib.

8. The sealing tool of claim 7, wherein the mount comprises an intermediate member fixing configured to fix the intermediate member on the aircraft rib, wherein the intermediate member fixing is adjustable between at least two of a fixed condition in which the intermediate member is fixed in a position on the aircraft rib; a guide condition in which the intermediate member is restrained by the intermediate member fixing and movable relative to the aircraft rib; and an unfixed condition in which the intermediate member is removable from the aircraft rib.

9. The sealing tool of claim 7, wherein the mount is configured to selectably fix the seal member in a position on the intermediate member independently of the mount being configured to selectably fix the intermediate member in a position on the aircraft rib.

10. The sealing tool of claim 9, wherein the mount comprises a seal member fixing configured to fix the seal member on the intermediate member, wherein the seal member fixing is adjustable between at least two of: a fixed condition in which the seal member is fixed in a position on the intermediate member; a guide condition in which the seal member is movable relative to the intermediate member in a constrained manner; and an unfixed condition in which the seal member is removable from the intermediate member.

11. The sealing tool of claim 6, wherein the mount comprises at least two guide members configured to protrude from the intermediate member.

12. The sealing tool of claim 11, wherein the intermediate member is configured to slide along the aircraft rib about the guide members.

13. The sealing tool of claim 12, comprising guide holes in the intermediate member through which the guide members are configured to extend, wherein at least one dimension of each of the guide holes is greater than the corresponding dimension of each of the guide members to allow relative movement of the guide members in the guide holes.

14. The sealing tool of claim 13, wherein the guide members are configured to be received through mounting holes in the aircraft rib.

15. The sealing tool of claim 11, wherein each guide member comprises a shoulder, wherein the intermediate member is configured to be received between the shoulders and the aircraft rib.

16. The sealing tool of claim 15, comprising at least one recess in at least one of the intermediate member and the seal member configured to receive the shoulders.

17. The sealing tool of claim 14, wherein the guide holes in the intermediate member are guide slots, and the mounting holes in aircraft rib are mounting slots.

18. The sealing tool of claim 17, wherein the guide slots are configured to extend transverse to the mounting slots when the guide members extend through the mounting slots and the intermediate member guide slots.

19. A seal assembly for sealing a stringer-receiving opening in an aircraft rib, the seal assembly comprising:
an intermediate member comprising an intermediate plate; and
a seal member comprising a seal plate and a seal, wherein the seal member is adjustably mounted on the intermediate member, the seal assembly sealing a gap formed by the opening between the aircraft stringer and the aircraft rib;
wherein the intermediate member receives and aligns the seal member over the gap, and
the seal assembly further comprising a mount configured for mounting the intermediate member on the aircraft rib with the intermediate member positioned between the aircraft rib and the seal member.

20. An aircraft assembly comprising:
a rib having an opening between two rib feet;
a stringer received in and extending through the opening; and
a seal assembly comprising:
an intermediate member comprising an intermediate plate mounted on the rib; and
a seal member comprising a seal plate and a seal, wherein the seal member is adjustably mounted on the intermediate member;
wherein the intermediate member receives and aligns the seal member over the gap, the sealing assembly sealing a gap formed by the opening between the stringer and the rib.

21. A method of sealing a stringer-receiving opening in an aircraft rib with a sealing tool;
the sealing tool comprising an intermediate member, a seal member on the intermediate member, and a mount, wherein the intermediate member includes an intermediate plate, and the seal member includes a seal plate and a seal;
the method comprising:
aligning the intermediate member with the opening;
fixing the intermediate member on the aircraft rib;
adjustably mounting the seal member to the intermediate member, and
using the intermediate member to align the seal member over a gap formed by the opening between the stringer and the aircraft rib; and
fixing the seal member over the gap to seal the opening.

22. The method of claim 21, comprising using an alignment member to align the intermediate member prior to fixing the intermediate member on the aircraft rib.

23. A sealing tool for sealing a stringer-receiving opening in an aircraft rib, the sealing tool comprising:
a seal member arranged to seal a gap formed by an opening between a stringer and the aircraft rib; and
an intermediate member configured to be adjustably mounted on the aircraft rib;
wherein the intermediate member is arranged to receive and align the seal member over the gap,
a mount configured to mount the intermediate member on the aircraft rib and the seal member on the intermediate member, wherein the mount comprises at least two guide members configured to protrude from the intermediate member, wherein each guide member comprises a shoulder, and wherein the intermediate member is configured to be received between the shoulders and the aircraft rib.

* * * * *